United States Patent Office 3,411,885
Patented Nov. 19, 1968

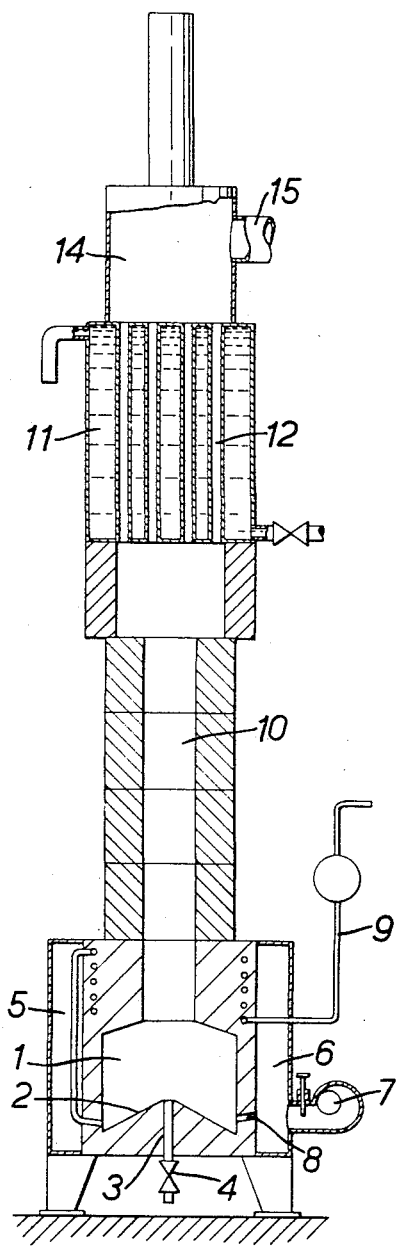

3,411,885
APPARATUS AND PROCESS FOR PRODUCING CARBON BLACK
Lennart Hugo Malmstrom and Carl Olof Malmstrom, Norrkoping, Sweden, assignors to Svenska Carbon Black Aktiebolag, Sjotullsgatan, Norrkoping, Sweden, a Swedish company
Filed Mar. 2, 1966, Ser. No. 531,188
Claims priority, application Sweden, Mar. 15, 1965, 3,320/65; June 16, 1965, 7,920/65
8 Claims. (Cl. 23—209.6)

ABSTRACT OF THE DISCLOSURE

A furnace for producing carbon black is provided with a heated refractory lined reaction chamber into which liquid hydrocarbons to be combusted are fed and form a pool of liquid at the base. An oxygen-containing combustion gas is fed to the chamber through a number of tangential inlets directed obliquely downwardly so that the entering gas gives turbulent combustion of the oil vapours generated by the heat radiated from the furnace lining. Combustion products exit from the chamber through an outlet at the top of the furnace.

---

This invention relates to a furnace for producing carbon black and to a process using said furnace.

Carbon black is produced by the incomplete combustion of hydrocarbons with an oxygen containing gas, such as air. In the furnace process the hydrocarbons are burnt under turbulent conditions and the hydrocarbons are normally injected into the furnace through an atomising burner. While the use of atomisers assists in the mixing of the hydrocarbons with the combustion gas, atomisers are liable to become blocked and to require careful maintenance and all the ash components of the oil remain in the carbon black.

The present invention is concerned with a carbon black producting furnace which requires no atomising equipment and which is consequently simpler in design while still producing carbon black of good commercial quality.

According to the present invention, a furnace for producing carbon black comprises a vertical cylindrical reaction chamber lined with refractory material, an inlet at the base of the furnace chamber for normally liquid hydrocarbons so arranged that the liquid hydrocarbons entering the furnace form a pool of liquid at the base, a number of tangential inlets for combustion gas so arranged that the gas gives turbulent combustion of the oil vapours generated by the heat radiated from the furnace lining and an outlet for the combustion products at the top of the furnace. Preferably the tangential inlets are directed obliquely downwardly so that the gas strikes the surface of the pool of liquid.

Preferably the base of the furnace is convex upwardly so that the pool of liquid hydrocarbons is in the form of an annulus.

The feed line for the liquid hydrocarbons is preferably helically wound around the exterior of the furnace so that the hydrocarbons are pre-heated before entering the base of the furnace.

The furnace is preferably surrounded by an air tight jacket into which the combustion gas is fed. The tangential inlets for the combustion gas feed the gas from this jacket into the furnace and the rate of flow of the gas into the chamber can be conveniently controlled by control of the gas pressure in the jacket. The use of a jacket surrounding the furnace not only helps in pre-heating the combustion gas but also reduces the heat loss from the furnace.

The present invention includes a process for producing carbon black comprising feeding liquid hydrocarbon to the base of a vertical cylindrical furnace lined with refractory material so that the liquid hydrocarbons form a liquid pool on the base, feeding a combustion gas tangentially through the wall of the furnace so that the gas gives turbulent combustion of the oil vapours generated by the heat radiating from the furnace lining, controlling the amount of combustion gas to partially burn the hydrocarbons, withdrawing the combustion products from the top of the furnace, cooling the combustion products and recovering carbon black.

Preferably the combustion gas is fed obliquely downwards as well as tangentially.

The combustion gas may be any suitable oxygen-containing gas including oxygen itself, but it is preferably air. The amount of combustion gas is preferably such that from 40 to 60% wt. of the carbon in the liquid hydrocarbons is converted to carbon black.

Any suitable liquid hydrocarbon feedstock may be used. The furnace and process of the present invention are however particularly suitable for producing carbon black from heavy hydrocarbons of petroleum origin. The feedstock may be a petroleum fraction boiling above 150° C. and particularly above 250° C. with an average molecular wt. of at least 150. Examples of suitable feedstock are gas oils, fuel oils and lubricating oil extracts.

Suitable furnace temperatures may be in the range 1000–1400° C., particularly 1100–1300° C. The intial combustion in the furnace proper may be followed by a further period of interaction between the combustion products. This further interaction may take place in the upper part of the furnace itself or in a separate secondary chamber.

After combustion and interaction are complete, the products are cooled to a temperature such that separation of the carbon black is possible. In current commercial practice, cooling is carried out by injecting water into the combustion products and cooling by direct water quench may be used if desired. Indirect cooling of the products has, however, a number of advantages over water quench and hence the present invention is preferably used in combination with the invention described and claimed in the specification of Swedish Patent Application No. 1897/65. This specification describes a tubular cooler having reciprocating scrapers to prevent the deposition of solid particles on the internal walls of the cooler and the use of such a tubular cooler for cooling the products of a carbon black producing process.

After cooling the carbon black may be separated in known manner for example by means of an electro-filter, and collected. In operating electro-filters it is particularly important to keep the insulators for the electrodes free from deposits of carbon black and a particularly suitable way of doing this is described and claimed in simultaneously filed specification entitled "Improvements relating to electro-filters" and based on the same priority document as the present application, viz. Swedish patent application No. 3320/65.

The invention is illustrated with reference to the accompanying FIGURE 1 which is a section through a furnace according to the present invention.

In the drawing, a reactor chamber 1 is in the form of an upright cylinder lined throughout with refractory material. The base 2 of the chamber is cone shaped and there may be a pipe 3 leading from the apex of the cone to a valve 4. This pipe and valve can be used for introducing oil into the furnace if desired. The chamber 1 has a jacket 5 at a distance from the outer wall of the chamber so that space 6 is formed around the chamber. The space 6 is connected to a source of air under pressure, for example a fan 7. From the space 6 a number of nozzles 8 pass tangentially and obliquely downwards through the chamber wall to the base 2 of the chamber. Pressure air, preheated by the chamber wall in the space 6 can thus be injected towards the base 2 of the chamber where it will strike a pool of liquid hydrocarbons which is conveyed to the base of the chamber through a pipe 9. Pipe 9 encircles the chamber as a helix so that the liquid hydrocarbons are also pre-heated before entering the chamber. The tangential, downward jets of air from nozzles 8 produce turbulent conditions within the chamber so that the vapours generated by the heat radiating from the furnace are partially burned to carbon, carbon oxides and hydrogen. The number and size of the nozzles 8 will depend on the dimensions of the furnace. In a furnace of 0, 8 metres diameter, 12 nozzles having an internal diameter of 2 cm. were found satisfactory. Further reaction and combustion occur as the products pass as a mixture of gas and solid particles upwardly into and through a reactor shaft 10. The upward flow of reaction products is maintained by the pressure differential between the various parts of the reaction system. The products are cooled in a tube cooler 11, having vertical tubes 12, surrounded by a jacket containing cooling fluid. Preferably the tubes 12 have reciprocating scrapers (not shown) as described in the specification of Swedish patent application No. 1897/65. The cooled products then pass into gas chamber 14 and out through line 15 to devices (not shown) in which the carbon black is separated and collected. The separating device may conveniently be an electro-filter, which is preferably constructed and operated in the way described in the specification of the simultaneously filed application entitled "Improvements relating to electro-filters." The electro-filter in this specification has means for feeding a small part of the exit gas, freed from carbon black, to the insulator chamber of the electro-filter.

The invention is further illustrated in the following example.

*Example*

A furnace as described in FIGURE 1 was operated over a period of 25 days on a large experimental scale, the average yield of carbon black being one ton/day.

The feedstocks used were petroleum fractions having the following characteristics.

on samples taken at regular intervals during the run showed the carbon black to be of SRF (semi-reinforcing furnace) quality.

We claim:
1. A furnace for producing carbon black comprising a vertical cylindrical reaction chamber lined with refractory material, an inlet at the base of the furnace chamber for normally liquid hydrocarbons so arranged that the liquid hydrocarbons entering the furnace form a pool of liquid at the base, a number of tangential inlets for oxygen-containing combustion gas, said tangential inlets being directed obliquely downwards so that the gas gives turbulent combustion of the vapours generated by the heat radiating from the furnace lining, and an outlet for the combustion products at the top of the furnace.

2. A furnace as claimed in claim 1 wherein the base of the furnace is convex upwardly.

3. A furnace as claimed in claim 1 wherein the feed line for the liquid hydrocarbons is helically wound around the exterior of the furnace.

4. A furnace as claimed in claim 1 wherein an air tight jacket surrounds the furnace into which the combustion gas can be fed, said jacket connecting with the interior of the furnace via the tangential inlets.

5. A process for producing carbon black comprising feeding liquid hydrocarbon to the base of a vertical cylindrical furnace lined with refractory material so that the liquid hydrocarbons form a liquid pool on the base, feeding oxygen-containing combustion gas tangentially obliquely downwards through the wall of the furnace so that the gas gives turbulent combustion of the vapours generated by the heat radiating from the furnace lining, controlling the amount of combustion gas to partially burn the hydrocarbons, withdrawing the combustion products from the top of the furnace, cooling the combustion products and recovering carbon black.

6. A process as claimed in claim 5 wherein the amount of combustion gas is controlled to give from 40–60% wt. conversion of the liquid hydrocarbons to carbon black.

7. A process as claimed in claim 5 wherein the liquid hydrocarbon feedstock is a petroleum fraction boiling above 150° C.

8. A process as claimed in claim 5 wherein the furnace temperature is in the range 1000–1400° C.

|  | Gas oil | Fuel oil | Fuel oil/ lubricating oil extract | Lubricating oil extract | Aromatic gas oil |
|---|---|---|---|---|---|
| Density at 20° C | 0.825 | 0.941 | 0.956 | 1.005 | 0.943 |
| SG 60° F./60° F. (calc.) | 0.828 | 0.943 | 0.958 | 1.006 | 0.945 |
| Viscosity at 20° C. cs | 3.24 |  |  |  | 3.47 |
| Viscosity at 100° F. cs |  | 146 | 144 | 161 |  |
| Calc.(Red I) s. |  | 595 | 587 | 656 |  |
| Sulphur, percent wt | 0.58 | 2.70 | 3.29 | 5.25 | 0.19 |
| Flash point, ° C. (° F.) | 69(156) | 85(185) | 103(217) | 186(367) | 30(86) |
| Pour point, ° C. (° F.) | −24(−11) | +12(+54) | +12(+54) | 0(+32) | −36(−33) |
| Carbon residue, percent wt |  | 7.0 | 5.3 | 0.39 | 2.6 |
| Water, percent wt |  | 0.1 | 0.1 | 0.1 |  |
| Aniline point, ° C | 65.3 |  |  |  | −22 |
| Diesel index | 59 |  |  |  | −1 |
| FIA analysis: |  |  |  |  |  |
| Aromatics, percent vol |  |  |  |  | 89 |
| Olefins, percent vol |  |  |  |  | 7 |
| Distillation: |  |  |  |  |  |
| IBP, ° C |  |  |  |  | 88 |
| 2%, ° C |  |  |  |  | 170 |
| 50%, ° C |  |  |  |  | 229 |
| 95%, ° C |  |  |  |  | 300 |
| Carbon/Hydrogen wt. ratio |  | 8.12 |  | 8.4 | 9.48 |
| Average MWt. (est.) | ca. 190 | 380 | 360 | 295 | ca. 160 |
| Ash content, percent wt |  | 0.04 |  | 0.004 |  |

The plant was operated under the following ranges of conditions.

| Temperature, ° C. |  |  |  | Air space pressure, mm. H²O | Oil flow, l./hr. |
|---|---|---|---|---|---|
| Furnace body | Reactor inlet | Cooler outlet | Electro-filter outlet |  |  |
| 1,140–1,300 | 1,080–1,160 | 260–320 | 120–200 | 210–470 | 149–169 |

Carbon black was produced in a yield of from 40 to 60% wt. based on the weight of liquid feedstock and tests

References Cited

UNITED STATES PATENTS

| 673,185 | 4/1901 | Wegelin | 23—209.8 |
| 897,439 | 9/1908 | Wegelin | 23—259.5 |
| 3,071,443 | 1/1963 | Bellew | 23—209.6 X |
| 3,340,010 | 9/1967 | Selfridge | 23—209.4 |
| 3,342,556 | 9/1967 | Ruble | 23—209.4 |

EDWARD J. MEROS, *Primary Examiner*.